(12) United States Patent
Tanaka

(10) Patent No.: US 7,948,132 B2
(45) Date of Patent: May 24, 2011

(54) AXIAL GAP-TYPE ELECTRIC MOTOR

(75) Inventor: Daiki Tanaka, Atsugi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 228 days.

(21) Appl. No.: 12/208,911

(22) Filed: Sep. 11, 2008

(65) Prior Publication Data

US 2009/0072640 A1  Mar. 19, 2009

(30) Foreign Application Priority Data

Sep. 14, 2007 (JP) ................................. 2007-239268

(51) Int. Cl.
*H02K 5/00* (2006.01)
(52) U.S. Cl. ............................... 310/94; 310/51; 310/90
(58) Field of Classification Search .................... 310/51, 310/90, 94, 191, 209
See application file for complete search history.

(56) References Cited

U.S. PATENT DOCUMENTS

| | | | | |
|---|---|---|---|---|
| 4,306,167 A | * | 12/1981 | Tomite et al. ................. | 310/153 |
| 2006/0056996 A1 | * | 3/2006 | Cook .......................... | 417/410.1 |

FOREIGN PATENT DOCUMENTS

JP  8-107650  4/1996

OTHER PUBLICATIONS

Patent Abstracts of Japan, Publication No. 08107650 A, Publication Date Apr. 23, 1996, 1 page.
Office Action issued in Chinese Patent Application No. 200810215386.2, dated Nov. 15, 2010 (4 pages).

* cited by examiner

*Primary Examiner* — Dang D Le
(74) *Attorney, Agent, or Firm* — Osha Liang LLP

(57) ABSTRACT

An electric motor includes a stator, at least one rotor, an output shaft engaged with the at least one rotor, and a contact area changing device configured to change an area of contact between the at least one rotor and the output shaft, wherein the area of contact between the at least one rotor and the output shaft affects a characteristic resonant frequency of the at least one rotor. A method to reduce vibrations in an electric motor includes engaging an output shaft into at least one rotor, rotating the output shaft and the at least one rotor with respect to a stator, changing an area of contact between the at least one rotor and a radial protrusion of the output shaft, and shifting the resonant frequency of the at least one rotor with the changed area of contact.

19 Claims, 14 Drawing Sheets

AXIAL GAP-TYPE ELECTRIC MOTOR

CROSS-REFERENCE TO RELATED APPLICATIONS

The present application claims priority from Japanese Patent Application No. 2007-239268, filed Sep. 14, 2007. The contents of the priority application are hereby incorporated by reference in their entirety.

BACKGROUND OF THE DISCLOSURE

1. Field of the Disclosure

The present disclosure relates to a technique for preventing an axial gap-type electric motor, which arranges a stator and a disk-shaped rotor to be opposite each other along a direction of an axis of an output shaft, from being resonated by a surface vibration.

2. Description of the Related Art

It is known in the art that when a rotational speed of a rotor of a electrical motor reaches a characteristic resonant frequency of the electrical motor, the rotor vibrates, which causes the electrical motor to resonate.

In this regard, Japanese Laid-Open Patent Publication No. (Hei) 8-107650 ("Patent Document") discloses a technique for reducing the resonance of the electrical motor.

The electrical motor disclosed in the above reference changes installation rigidity by adjusting a fastening force of an installation rigidity adjusting bolt, which installs a heat exchanger in a frame of the electrical motor. This changes a characteristic frequency of the entire electrical motor. The technique disclosed in said reference is directed to enable quiet operation of the electric motor by avoiding resonation, even if the installation rigidity of the electrical motor differs from the evaluation conducted at the time of shipment from a factory.

However, the characteristic frequency of the rotor itself cannot be even by the conventional electrical motor. Particularly, in an axial gap-type electrical motor having a disk-shaped rotor, the thickness of the rotor is thin compared to its radius. Thus, the rigidity of the rotor is low and a surface vibration, which is when the ends of the rotor are bent or distorted with respect to a virtual plane perpendicular to the axis of the output shaft and the ends rapidly oscillate from one side of the virtual plane to another, tends to occur.

When the rotational speed of the rotor conforms to the characteristic frequency of the rotor itself, the resonance of the rotor is considerably increased, thereby disturbing the quiet operation of the electrical motor.

Further, a reinforcing member such as a rib may be installed in the rotor. However, the reinforcing member may inhibit the functionality of a magnetic circuit of an electromagnetic force for driving the rotor. The rib may also increase the volume of the rotor itself, and thus, the density of a magnetic flux along the rotor may be weakened, thereby decreasing the rotor output torque.

SUMMARY OF THE CLAIMED SUBJECT MATTER

In one aspect, the present disclosure relates to an electric motor including a stator, at least one rotor, an output shaft engaged with the at least one rotor, and a contact area changing device configured to change an area of contact between the at least one rotor and the output shaft, wherein the area of contact between the at least one rotor and the output shaft affects a characteristic resonant frequency of the at least one rotor.

In another aspect, the present disclosure relates to a method to reduce vibrations in an electric motor including engaging an output shaft into at least one rotor, rotating the output shaft and the at least one rotor with respect to a stator, changing an area of contact between the at least one rotor and a radial protrusion of the output shaft, and shifting the resonant frequency of the at least one rotor with the changed area of contact.

In another aspect, the present disclosure relates to an electric motor including a stator, at least one rotor means, an output shaft means engaged with the at least one rotor means, and a contact area changing means for changing an area of contact between the at least one rotor and the output shaft, wherein the area of contact between the at least one rotor and the output shaft affects a characteristic resonant frequency of the at least one rotor means.

BRIEF DESCRIPTION OF DRAWINGS

Features of the present disclosure will become more apparent from the following description in conjunction with the accompanying drawings.

DETAILED DESCRIPTION

Example embodiments of the present disclosure will be explained in detail based on the provided drawings. However, it should be understood that the embodiments disclosed herein are exemplary, and that nothing should preclude additional embodiments from being considered within the scope of the attached claims.

First Exemplary Embodiment

Figure 1:
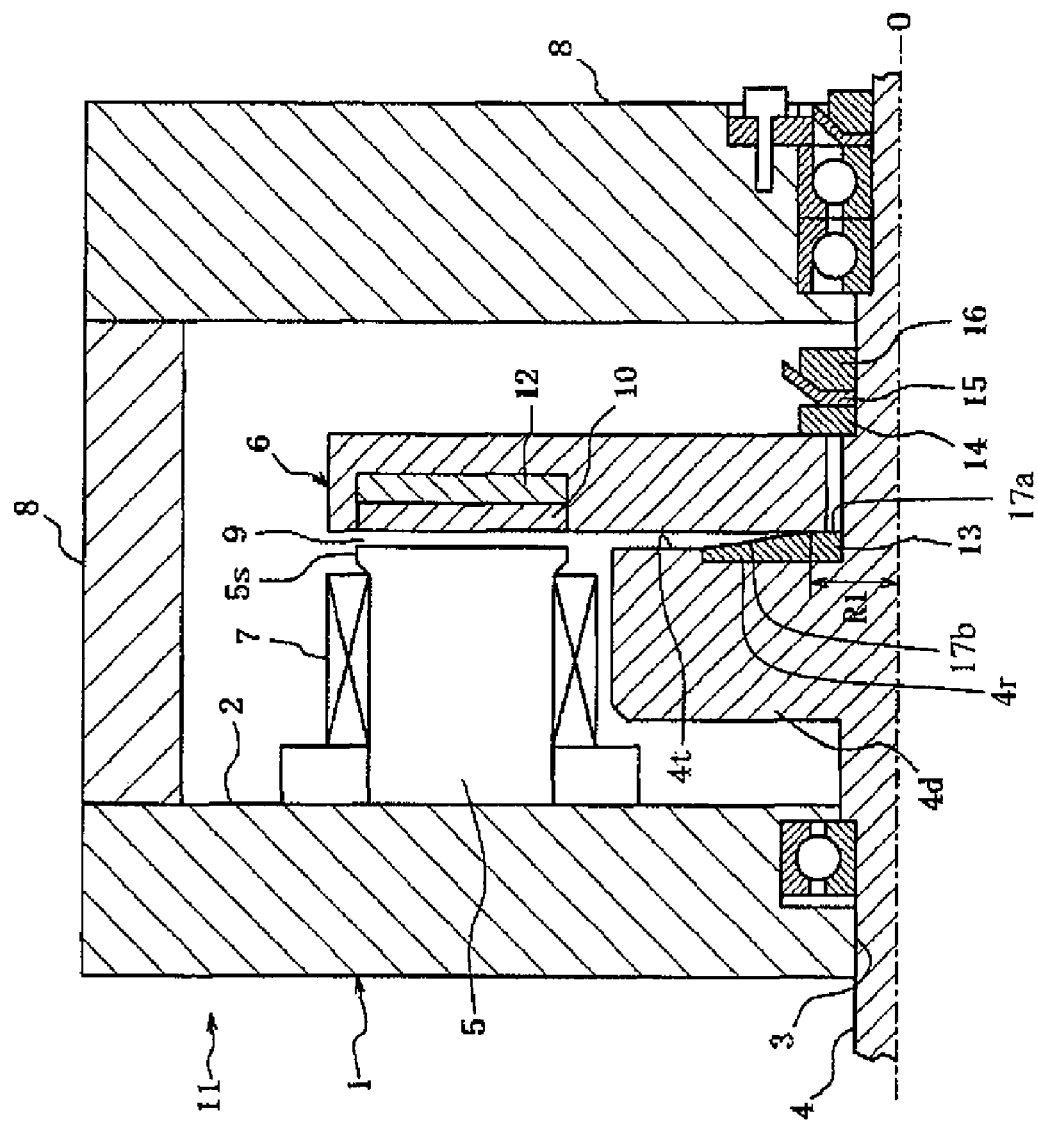
FIG. 1 is a cross-sectional view schematically showing a structure of an axial gap-type electrical motor operating in a first operational state in accordance with a first exemplary embodiment of the present disclosure.
Figure 2:
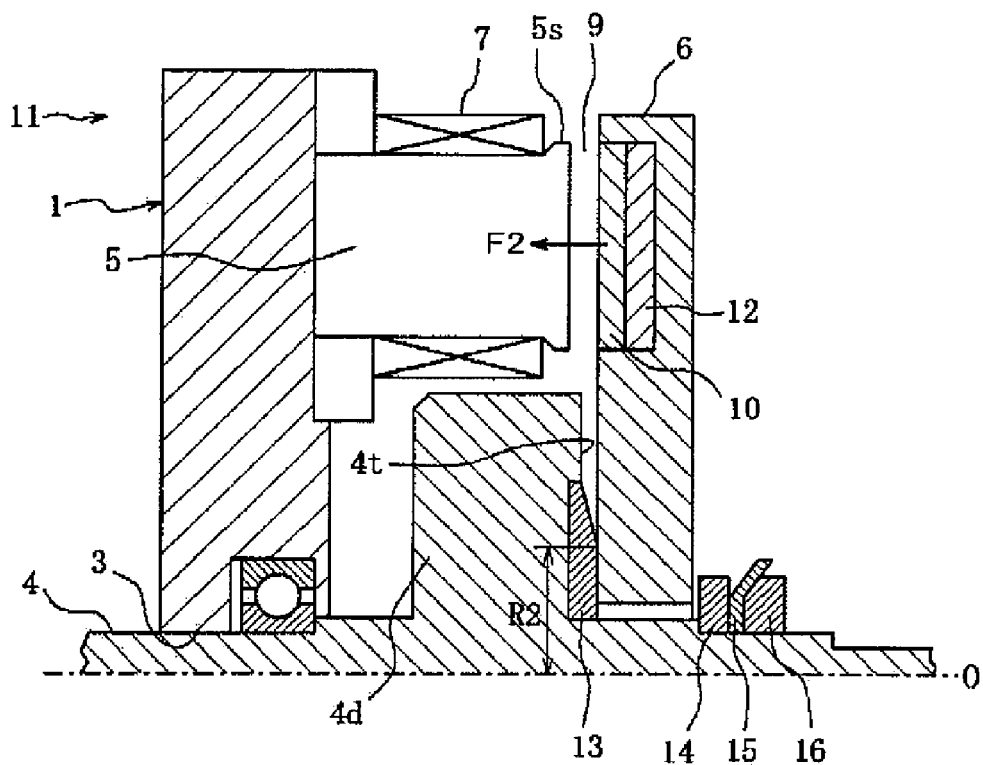
FIG. 2 is a cross-sectional view schematically showing a structure of the axial gap-type electrical motor operating in a second operational state in accordance with the first exemplary embodiment of the present disclosure.
Figure 3:
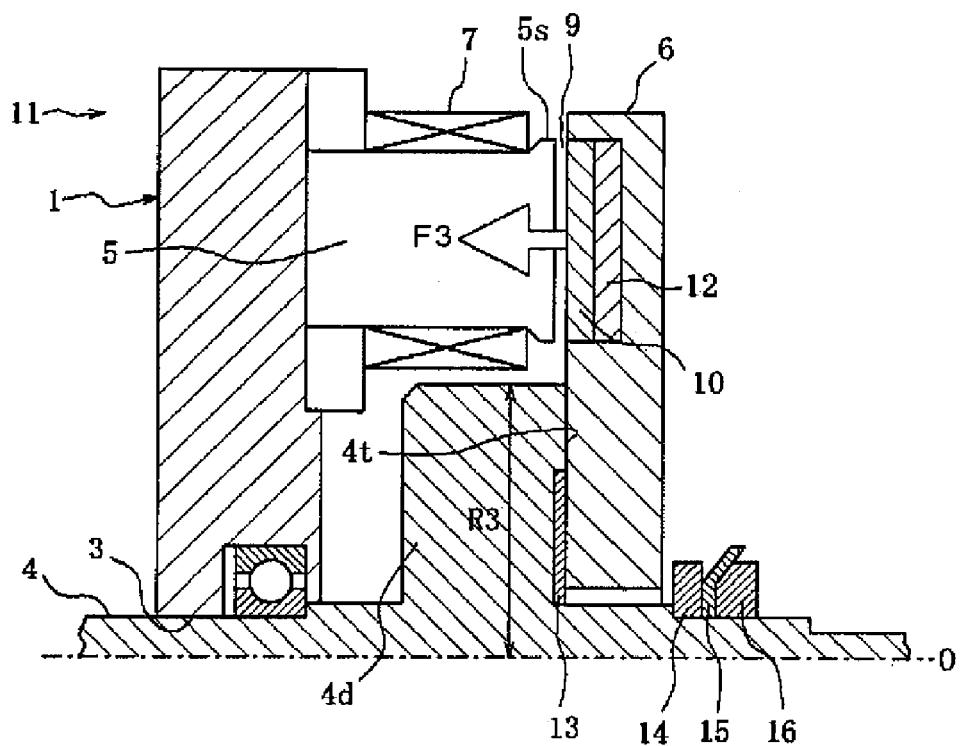
FIG. 3 is a cross-sectional view schematically showing a structure of the axial gap-type electrical motor operating in a third operational state in accordance with the first exemplary embodiment of the present disclosure.

FIGS. 1 to 3 are cross-sectional views schematically showing a structure of an axial gap-type electrical motor in accordance with a first exemplary embodiment of the present disclosure.

A stator 1 of an axial gap-type electrical motor 11 comprises a stator core 2, a stator iron core 5 and an armature winding 7.

The stator core 2 formed of electromagnetic materials has a circular ring shape and an outer periphery of the stator core 2 is supported by and fixed to a motor case 8. Further, a center hole 3 is formed in a center portion of the stator core 2 to receive an output shaft 4. The output shaft 4 is rotatably supported at a bearing installed in the center hole 3. The stator core 2, includes several stator iron cores 5 which are disposed at an equal distance from each other and arranged to correspond to the circumference of the stator core 2. Each stator iron core 5 may be formed by stacking steel plates, and protrudes from the stator core 2 in the axial direction substantially parallel to an axis 0 of the output shaft 4. Each stator iron core may also include a leading end 5s facing the rotor 6, and armature windings 7 may be wound around each stator iron core 5 between the stator core 2 and the leading end 5s. As shown, leading end 5s has a height larger than that of the stator core 2 so that the armature windings may be retained between the leading end 5s and the stator core 2.

The rotor 6 may have a disk shape and may include several permanent magnets 10 on the surface of the rotor 6 facing stator core 2. Each of the permanent magnets may be disposed at an equal circumferential distance from each other in locations corresponding to each of the stator iron cores 5 and are may further be arranged to correspond to the circumference of the rotor 6. The rotor 6 and the leading end 5s of the stator iron winding are shown spaced apart via an air gap 9. A back yoke 12 is shown embedded at an inner portion of the rotor 6 and coupled to the permanent magnet 10. The permanent magnet 10 may be magnetized along the direction of the axis 0 and the back yoke 12 may form a magnetic circuit along which a magnetic field may flow. An alternating current may flow through the armature winding 7 which generates an electromagnetic force between the stator 1 and the rotor 6, causing the permanent magnet 10 to rotate the rotor 6 so that the axial gap-type motor 11 functions as a synchronous motor.

The output shaft 4 passes through a center of the rotor 6 and may engage the rotor 6 through a spline engagement so that the output shaft 4 and rotor 6 rotate about axis 0 together. At a position along the output shaft 4 corresponding generally to the stator iron cores 5, a ring-shaped radial protrusion 4d may extend from an outer peripheral surface of the output shaft 4. The radial protrusion 4d may have an end surface 4t substantially perpendicular to the axis 0 facing the rotor 6. As shown, the end surface 4t includes a recess 4r such that a ring-shaped stopper 13 may be installed there within.

As shown in FIG. 1, the stopper 13 includes a contact surface where the front surface of the rotor 6 contacts the stopper 13. The contact surface includes a straight surface 17a extending substantially perpendicular to the axis 0 and a linear tapered surface 17b protruding from the end surface 4t downward toward the output shaft 4 until it meets the straight surface 17a, and outward in the direction of the axis 0 toward the rotor 6. While contact surface (17a and 17b) is shown as a combination of straight surface 17a and tapered surface 17b, the relative proportions of straight surface 17a and tapered surface 17b may be varied. Additionally, contact surfaces entirely straight (e.g., 17a) or entirely tapered (e.g., 17b) should be considered within the scope of the present disclosure and attached claims.

In selected embodiments, stopper 13 may be formed of light metal characterized by a low Young's modulus (for a metal) or a hard rubber or resin characterized by a high Young's modulus (for rubbers and resins), the stopper 13 may be configured to slightly deform if rotor 6 is thrust thereupon along axis 0. Such thrusting (and deformation of stopper 13) may change the surface area of the contact surface (17a and 17b) contacting the rotor 6.

Around the output shaft on the side of the rotor 6 opposite the stopper 13, a ring-shaped collar 14, a crown washer 15 and a lock nut 16 may be threaded upon output shaft 4 so as not to be loosened along the direction of the axis 0. The collar 14 may prevent the rotor 6 from being removed from the output shaft 4 in a direction away from the radial protrusion 4d.

Thus, output shaft 4, stopper 13, rotor 6, stator 1, collar 14, washer 15 and lock nut 16 interactively operate to constitute a mechanism for changing the contact area (i.e., contact surfaces 17a and 17b) between rotor and protrusion 4d of output shaft 4.

Next, a function of the axial gap-type electrical motor 11 will be explained. While the electromagnetic force is generated between the stator 1 and the rotor 6 by the magnetic circuit causing the rotor to rotate, an attraction force is generated between the stator 1 and the rotor 6. Because the stator 1 and the radial protrusion 4d face the same surface of the rotor 6, the attraction force, which becomes a magnitude of the electromagnetic force in the direction of the axis 0, may exert a thrust on the stopper 13 between the radial protrusion 4d and the rotor 6.

When the attraction force is low and, and thereby the thrust of the direction of the axis 0 upon the stopper 13 is low, because the stopper 13 is hardly deformed, a radius of the contact surface of the stopper 13 and the rotor 6 may be R1, as shown in FIG. 1.

However, when the attraction force is greater than the value shown in FIG. 1, the component of the electromagnetic force indicated by a thin arrow F2 in FIG. 2 may pull the rotor 6 closer to protrusion 4d than in FIG. 1. By doing so, because the stopper 13 may be deformed by the thrust, the length of the linear taper is decreased and the radius of the contact area of the contact surface of the stopper 13 may also be increased. The radius of the contact area at this time becomes R2, as shown in FIG. 2, where R1<R2.

When the attraction force is greater than the value shown in FIG. 2, the component of the electromagnetic force indicated by a thick arrow F3 in FIG. 3 pulls the rotor 6 closer to protrusion 4d than in FIG. 2. By doing so, because the stopper 13 is further deformed by the thrust, the linear taper disappears and the radius of the contact surface of the stopper 13 and the rotor 5 becomes R3, as shown in FIG. 3, where R1<R2<R3. In such a case, the end surface 4t of the radial protrusion 4d contacts the rotor 6, thereby continuing the contact surface of stopper 13. Because the end surface 4t and the rotor 6 are made of steels having the Young's modulus higher than the stopper 13, the rigidity of the support of the rotor 6 provided by the radial protrusion 4d is maximized.

The radius of the contact surface of the output shaft 4 and the rotor 6 may continuously change from R1 to R2 to R3 by the magnitude of the electromagnetic force in the direction of the axis 0. This changes the characteristic frequency wherein the rotor 6 is resonated by the surface vibration. If the attraction force is decreased from the state shown in FIG. 3, then the radius of the contact surface is decreased from R3 and may be returned to R1 or R2 as shown in FIGS. 1 and 2.

Figure 4A:
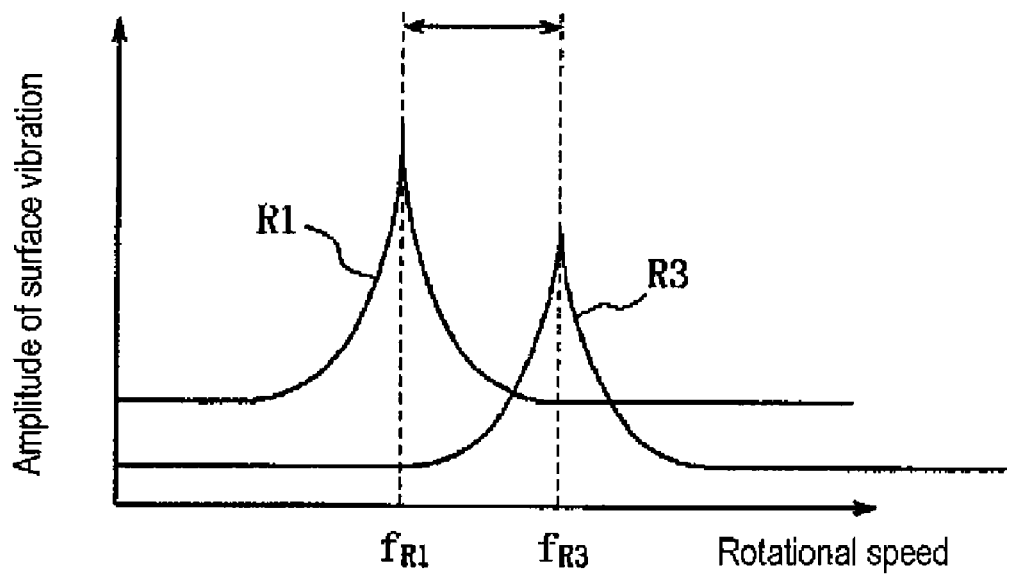
FIG. 4(a) is a graph showing a relationship between amplitude of the surface vibration of the rotor and a rotational speed of the rotor in accordance with the first exemplary embodiment of the present disclosure.

FIG. 4(a) is a graph showing a relationship between amplitude of the surface vibration of the rotor 6 and a rotational speed of the output shaft 4 in accordance with the rotor 6. When the radius of the contact surface is R1, the characteristic frequency wherein the amplitude of the surface vibration is maximized (i.e., the "resonant" frequency) of rotor 6 and output shaft 4) may be fR1. That is, when the rotational speed of the rotor 6 is at fR1, the rotor 6 may be at the point of maximum natural vibration. Because the characteristic frequency and the rotational speed of the rotor 6 are movements in a unit time, both are indicated in a horizontal axis of FIG. 4(a).

However, when the radius of the contact surface is R3, which is greater than R1, the characteristic resonant frequency of the rotor 6 wherein the amplitude of the surface vibration of the rotor 6 is maximized becomes fR3, which is also greater than fR1. As the radius of the contact surface is increased, the contact area may be increased as well. Accordingly, because the rigidity of the support of the rotor 6 provided by the radial protrusion 4d is increased, the characteristic frequency may be similarly increased.

Because the radius of the contact surface is changed between R1 and R3 as indicated by the arrow in FIG. 4(a) corresponding to the magnitude of the attraction force, the characteristic frequency and the surface vibration of the rotor 6 may also be changed, thereby deviating from the rotational speed of the rotor 6. For example, when the rotational speed of the rotor 6 is fR1, the attraction force may be small (e.g., as indicated by the small arrow in FIG. 2), causing the radius of the contact surface to be R1, thereby deviating the characteristic frequency of the rotor 6 from fR3. Further, when the rotational speed of the rotor 6 is fR3, the attraction force may be large (e.g., as indicated by the small arrow in FIG. 3), causing the radius of the contact surface to be R3, thereby deviating the characteristic frequency of the rotor from fR1. As a result, the resonant frequency (e.g., fR1, fR3) may vary such that it is never the same as the present rotational frequency of rotor 6. Therefore it may be possible to construct an axial gap-type motor having no "achievable" surface vibration resonant frequency.

Figure 4B:
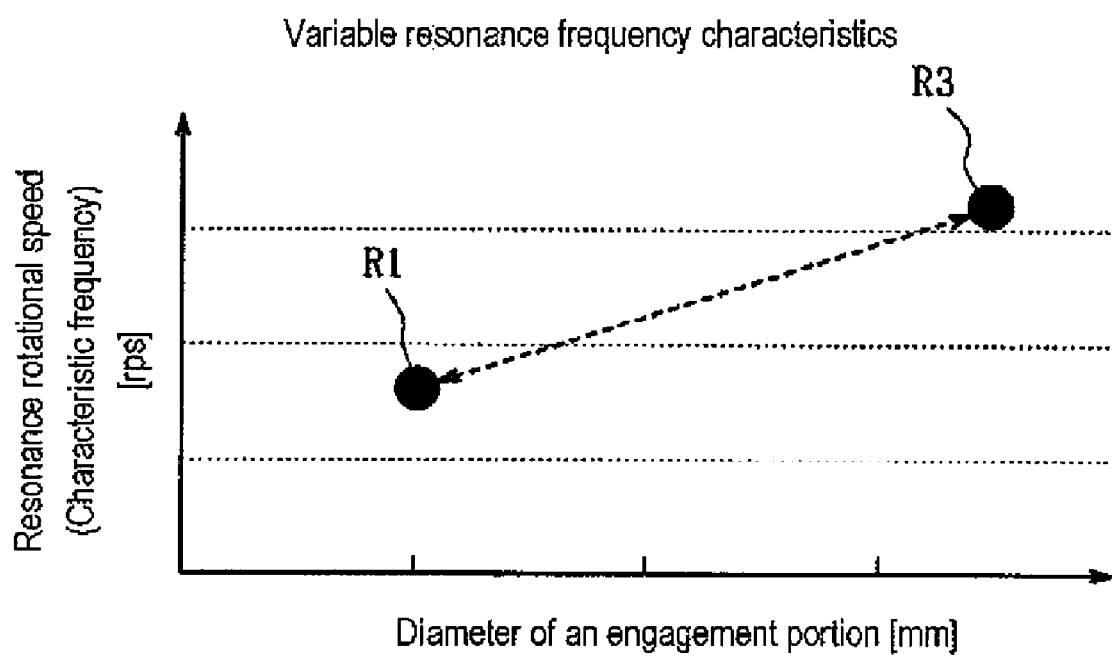
FIG. 4(b) is a graph showing a relationship between a change of a contact area and a resonance rotational speed.

The characteristic frequency of the rotor 6 shown in FIG. 4(a) may further be illustrated in the map provided in FIG. 4(b). A horizontal axis of FIG. 4(b) represents a diameter of an engagement portion wherein the radius of the contacting portion is doubled. Further, a longitudinal axis is a resonance rotational speed of the rotor 6, which is resonated by the surface vibration and equals to the characteristic frequency shown in FIG. 4(a). As shown in FIG. 4(b), when the diameter of the engagement portion is increased, the resonance rotational speed is increased. In the first exemplary embodiment, the resonance rotational speed of the rotor 6 is deviated from an actual rotational speed by changing the effective diameter of the engagement portion. By doing so, it may be possible to prevent the resonance of the surface vibration of the rotor 6 so that quiet operation is possible.

Second Exemplary Embodiment

Figure 5:
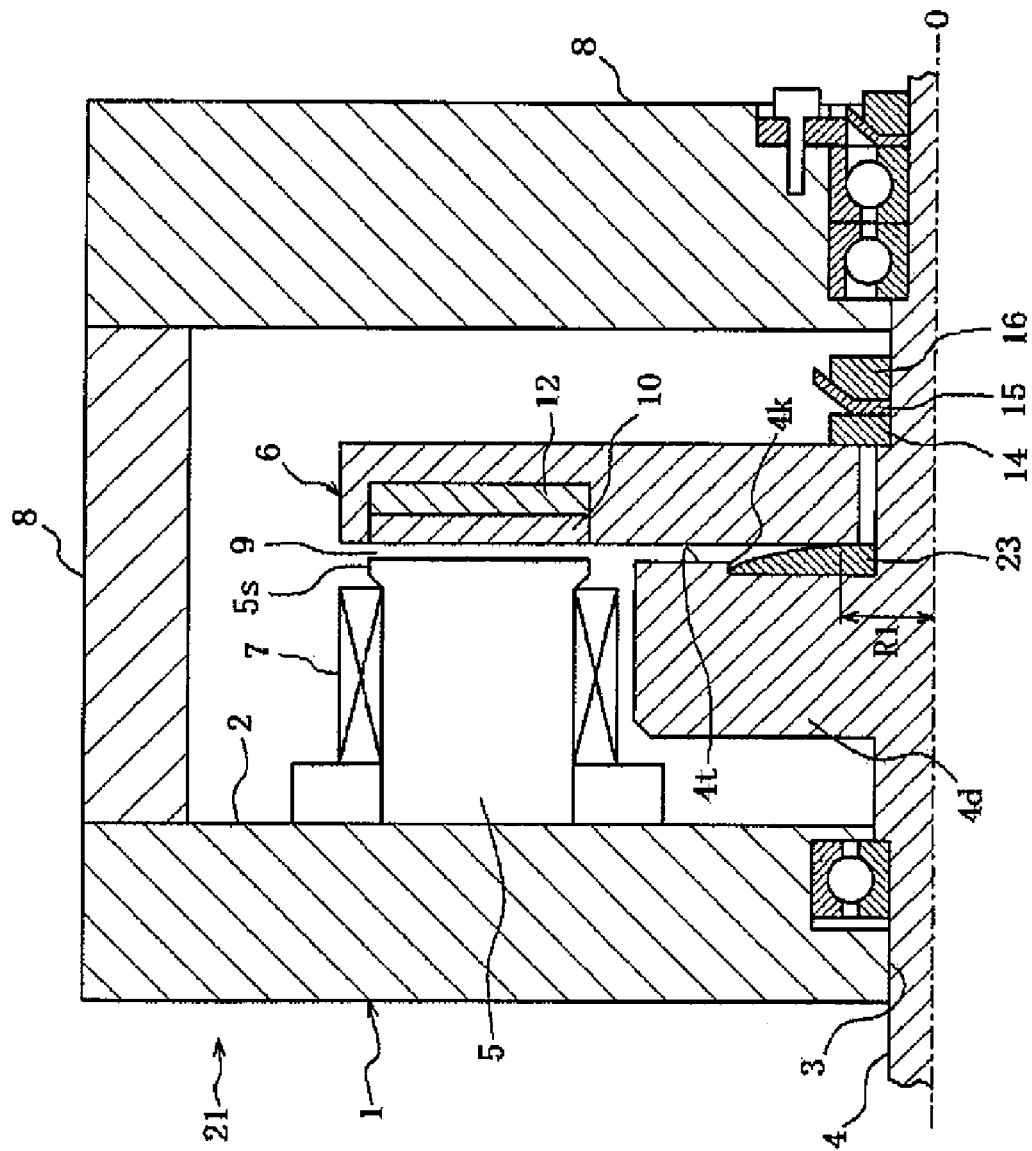
FIG. 5 is a cross-sectional view schematically showing a structure of an axial gap-type electrical motor operating in a first operational state in accordance with a second exemplary embodiment of the present disclosure.
Figure 6:
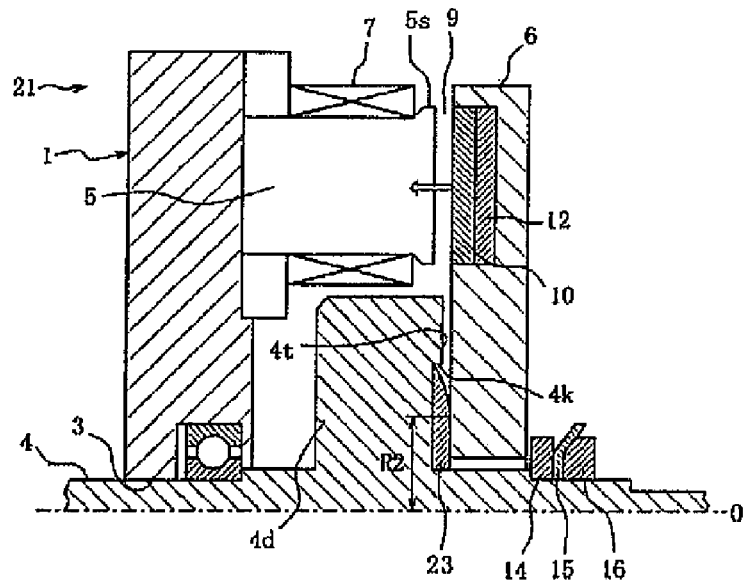
FIG. 6 is a cross-sectional view schematically showing a structure of an axial gap-type electrical motor operating in a second operational state in accordance with the second exemplary embodiment of the present disclosure.
Figure 7:
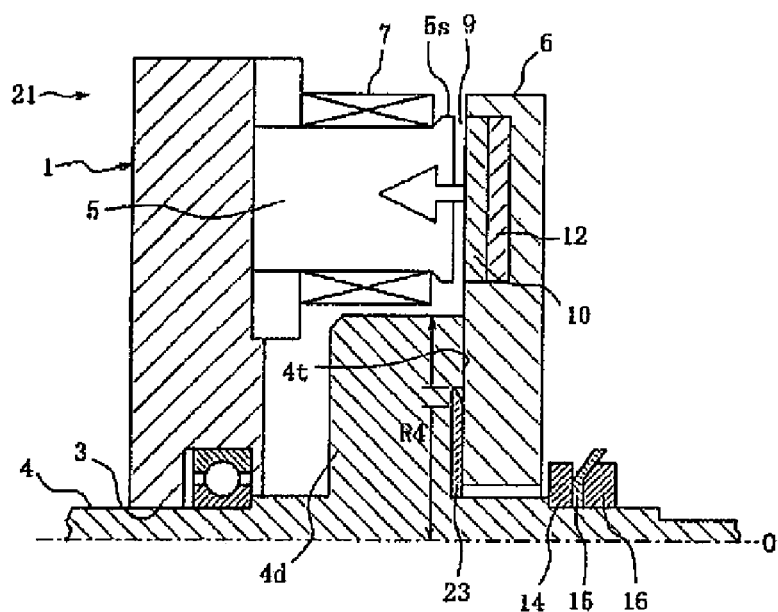
FIG. 7 is a cross-sectional view schematically showing a structure of an axial gap-type electrical motor operating in a third operational state in accordance with the second exemplary embodiment of the present disclosure.

FIGS. 5 to 7 are cross-sectional section views schematically showing a structure of an axial gap-type electrical motor 21 in accordance with a second exemplary embodiment of the present disclosure. FIG. 5 shows a state when the radius of the contact surface is small (R1). FIG. 6 shows a state when the radius of the contact surface is greater than that shown in FIG. 5 (R2). FIG. 7 shows a state when the radius of the contact surface is greater than that shown in FIG. 6 (R4). Because the basic constitution of the second exemplary embodiment is similar to that of the first exemplary embodiment, similar elements are denoted by the same reference numerals and explanations thereof are omitted herein.

An axial gap-type electrical motor 21 in accordance with the second exemplary embodiment has a ring-shaped stopper 23 through which the output shaft 4 passes. Although a material of the stopper 23 may be the same as the stopper 13 of the first exemplary embodiment, the contact surface of the stopper 23 may be constructed with a non-linear taper and may instead be formed as a convex arcuate taper. As such the convex arcuate taper of the stopper 23 may protrude toward the rotor 6 as an arcuate surface (e.g., a spherical or hyperbolic surface) protruding from the end surface 4t downward toward the output shaft 4 until it meets the outer peripheral surface of the output shaft 4 and outward toward the rotor 6. Thus, the stopper 23 may contact the front surface of the rotor 6 at the point the stopper 23 meets the output shaft 4. As such, the movement of the rotor 6 along the direction of the axis 0 may be changed without rattling.

Moreover, the outer peripheral portion of the stopper 23 proximate to the wall 4k of the recess of the radial protrusion 4d may be located inward of the end surface 4t with respect to the rotor 6, as shown in FIG. 5.

When the attraction force along the direction of the axis 0 to attract the stopper 23 towards the stator iron core 5 is small, a radius of a contact surface of the stopper 23 and the rotor 6 may be R1, as shown in FIG. 5 from negligible deformation of the stopper 23.

When the attraction force (i.e., the electromagnetic force) is greater than the value shown in FIG. 5, a magnitude of the electromagnetic force in the direction of the axis 0 indicated by a thin arrow in FIG. 6 pulls the rotor 6 more closely to protrusion 4d. By doing so, because the stopper 23 may be deformed by the thrust and the arcuate surface may therefore be reduced as well, the radius of the contact surface of the stopper 23 and the rotor 6 may be increased. Thus, the radius may become R2, as shown in FIG. 6, wherein R1<R2.

When the attraction force (i.e., the electromagnetic force) is even greater than the value shown in FIG. 6, the magnitude of the electromagnetic force in the direction of the axis 0 indicated by a thick arrow in FIG. 7 may pull the rotor 6 closer to protrusion 4d than in FIG. 6. By doing so, because the stopper 23 may be further deformed by the thrust and the arcuate surface may therefore nearly disappear, the radius of the contact surface of the stopper 23 and the rotor 6 may be increased. Thus, the radius may approach R4 (minus a small portion of the arcuate surface near the wall 4k of the recess) as shown in FIG. 7, where R1<R2<R4. In such a case, the end surface 4t of the radial protrusion 4d at the outer peripheral side compared to the stopper 23 contacts the rotor 6. Because the end surface 4t and the rotor 6 have a higher Young's modulus and a higher rigidity than the stopper 23, the rigidity of the support of the rotor may be maximized.

Figure 8:
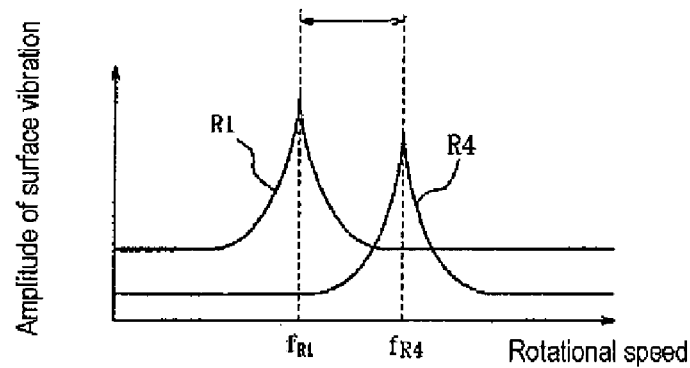
FIG. 8 is a graph showing a relationship between amplitude of a surface vibration of a rotor and a rotational speed of a rotor in accordance with the second exemplary embodiment of the present disclosure.

FIG. 8 is a graph showing a relationship between amplitude of the surface vibration of the rotor 6 and a rotational speed of the rotor 6 in accordance with the second exemplary embodiment of the present disclosure. When the radius of the contact surface is R1, the characteristic resonant frequency where the amplitude of the surface vibration of the rotor 6 is maximized may be described as fR1. That is, when the rotational speed is R1 and the contact surface of the rotor is R1, the surface vibration of the rotor 6 will be maximized.

When the radius of the contact surface is R4, which is greater than R1, the characteristic resonant frequency where the amplitude of the surface vibration of the rotor 6 becomes maximized changes to fR4, a speed greater than fR1. Thus, as the diameter of the contact surface is increased, the rigidity of the support of the rotor 6 may also increase. Thus, the characteristic frequency may also be increased.

Because the radius of the contact surface changes between R1 and R4 as indicated by the arrow in FIG. 8, the characteristic frequency caused by the surface vibration of the rotor 6 may change, thereby deviating from the rotational speed of the rotor 6. For example, when the rotational speed of the rotor approaches fR4, the radius of the contact surface may be R1 to thereby deviate the characteristic frequency of the rotor from fR4. Further, when the rotational speed of the rotor approaches fR1, the radius of the contact surface may be R4 to thereby deviate the characteristic frequency of the rotor from fR1. By doing so, it may be possible to prevent the resonance of the surface vibration of the rotor 6 and quiet operation of the axial gap-type motor 21 may be possible.

In particular, the contact surface of the rotor 6 and the output shaft 4 may be a combination of the stopper 23, which may be the arcuate surface protruded toward the direction of the axis 0, and the front surface of the rotor 6 for supporting such an arcuate surface in the second exemplary embodiment. As such, the change in the characteristic frequency of the rotor 6 with regard to the attraction force may differ from the stopper 13, which is the linear taper and straight surface, in the first exemplary embodiment. Further, because the small portion of the arcuate surface near the wall 4k of the recess is provided which does not contact the rotor 6 even when the radius is R4, the characteristic frequency of the rotor may be discontinuously changed.

Third Exemplary Embodiment

Figure 9:
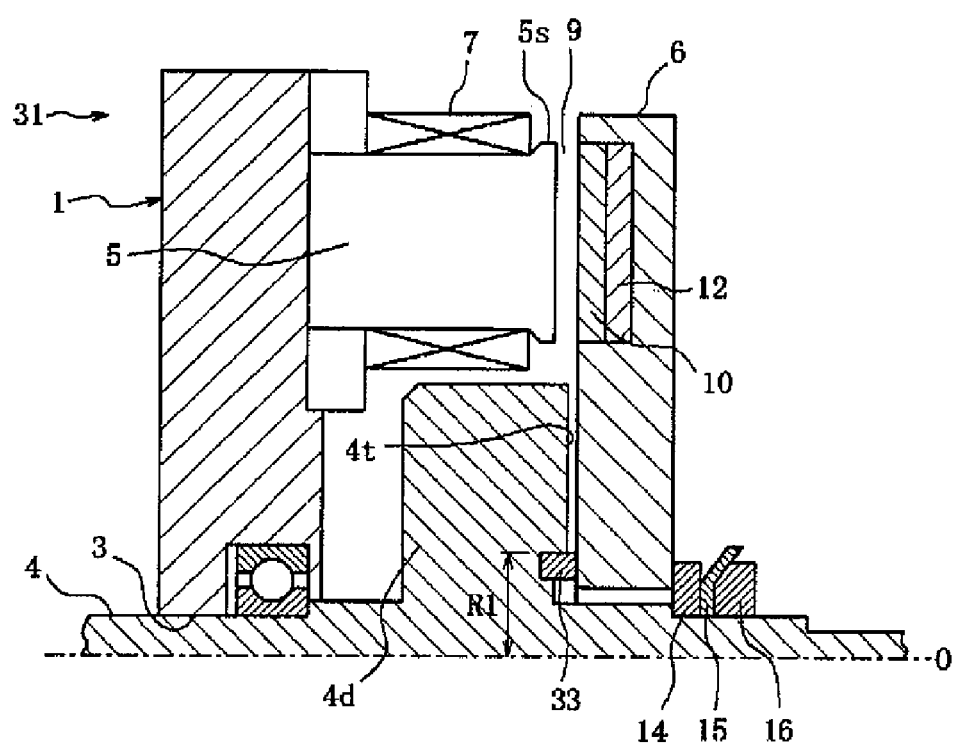
FIG. 9 is a cross-sectional view schematically showing a structure of an axial gap-type electrical motor operating in a first operational state in accordance with a third exemplary embodiment of the present disclosure.
Figure 10:
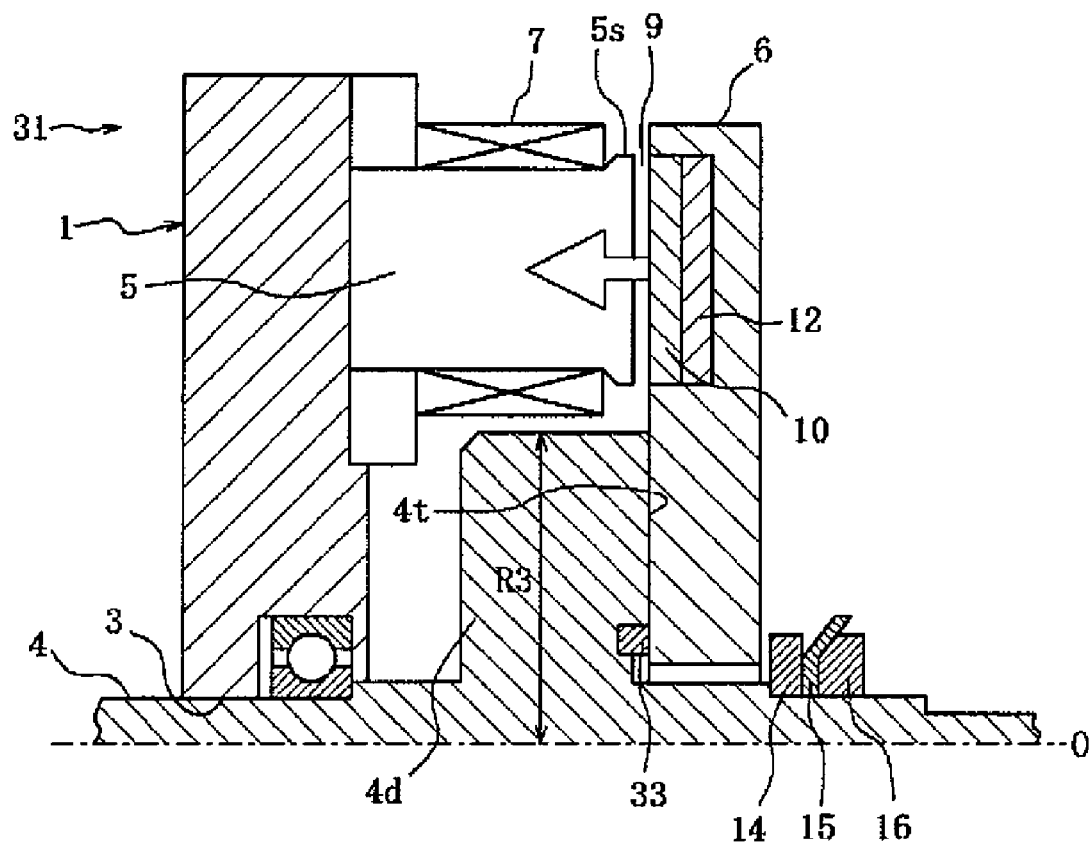
FIG. 10 is a cross-sectional view schematically showing a structure of an axial gap-type electrical motor operating in a second operational state in accordance with the third exemplary embodiment of the present disclosure.

FIGS. 9 and 10 are cross-sectional section views schematically illustrating a structure of an axial gap-type electrical motor 31 in accordance with a third exemplary embodiment of the present disclosure. FIG. 9 shows a state when the radius of the contact surface is relatively small (R1). FIG. 10 shows a state when the radius of the contact surface is relatively large (i.e., greater than FIG. 9) (R3). Because the basic constitution of the second exemplary embodiment is similar to that of the first exemplary embodiment, similar elements are denoted by the same reference numerals and explanations thereof are omitted herein.

An axial gap-type electrical motor 31 in accordance with the third exemplary embodiment comprises a stopper 33 through which the output shaft 4 is passes. Although a material of the stopper 33 may be the same as stopper 13 of the first exemplary embodiment, stopper 33 is shown such that its contact surface is neither a linear taper or an arcuate taper. Rather, stopper 33 includes a planar surface substantially perpendicular to the axis 0 and contacting the front surface of the rotor 6. As such, rotor 6 may be constructed such that its movement along the direction of the axis 0 may occur without rattling.

When an attraction force (i.e., an electromagnetic force) between the stator 1 and the rotor 6 is low and a magnitude of the electromagnetic force in the direction of the axis 0 is low, a radius of the contact surface of the stopper 33 and the rotor 6 may be R1. As such, stopper 33 (as shown in FIG. 9) is hardly deformed.

When the attraction force (i.e., the electromagnetic force) is greater than the value shown in FIG. 9, the magnitude of the electromagnetic force in the direction of the axis 0 may be large (as indicated by a thick arrow in FIG. 10). Such larger attraction force may pull the rotor 6 closely against protrusion 4d such that the contact surface of the rotor 6 may be R3. In such a case, the end surface 4t of the radial protrusion 4d additionally contacts the rotor 6. Because the end surface 4t and the rotor 6 have a higher Young's radius and a higher rigidity than the stopper 33, the rigidity of the support of the rotor 6 is maximized.

Because the radius of the contact surface changes between R1 and R3, the characteristic resonant frequency caused by the surface vibration of the rotor 6 may also change, thereby deviating from the rotational speed of the rotor 6. For example, when the rotational speed of the rotor 6 approaches fR3, the radius of the contact surface may be R1 to deviate the characteristic frequency of the rotor 6 away from fR3.

Further, when the rotational speed of the rotor 6 approaches fR1, the radius of the contact surface may be R3 to thereby deviate the characteristic frequency of the rotor 6 away from fR1. By doing so, it may be possible to prevent the axial gap-type motor 31 from achieving a speed associated with the characteristic resonance frequency of the rotor 6.

In particular, because the contact surface of the rotor 6 and the output shaft 4 may be a combination of the stopper 33, which is a planar surface perpendicular toward the direction of the axis 0, and the front surface of the rotor 6 for supporting such a planar surface, the change in the characteristic frequency of the rotor 6 with regard to the attraction force may differ from the stopper 13 (i.e., a linear taper) in the first exemplary embodiment and the stopper 23 (i.e., a arcuate taper) in the second exemplary embodiment.

Fourth Exemplary Embodiment

Figure 11:
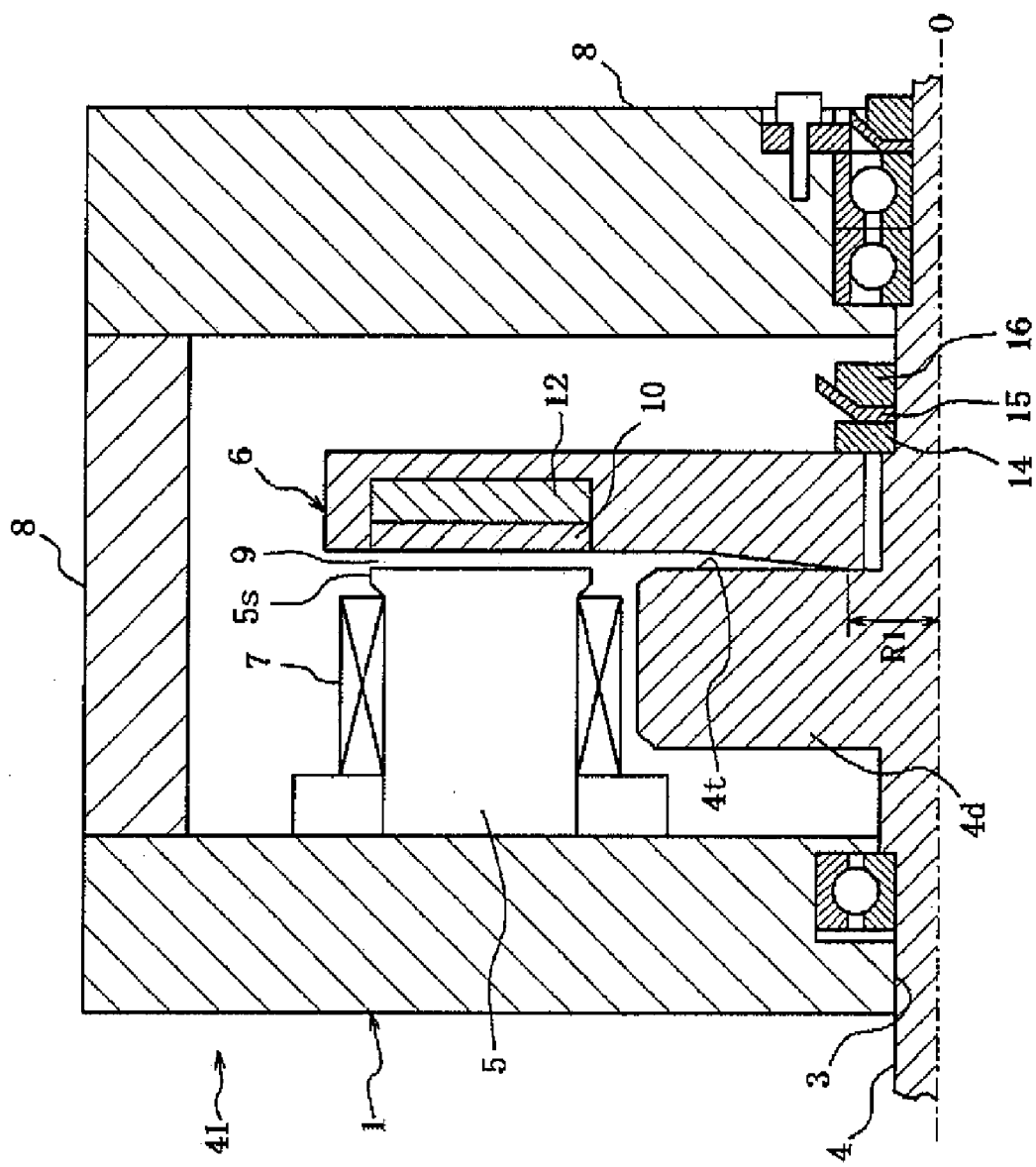
FIG. 11 is a cross-sectional view schematically showing a structure of an axial gap-type electrical motor in accordance with a fourth exemplary embodiment of the present disclosure.

FIG. 11 is a cross-sectional view schematically showing a structure of an axial gap-type electrical motor 41 in accordance with a fourth exemplary embodiment. FIG. 11 shows a state when the radius of the contact surface is small (R1). Because the basic constitution of the fourth exemplary embodiment is similar to that of the first exemplary embodiment, similar elements are denoted by the same reference numerals and explanations thereof are omitted herein.

In an axial gap-type electrical motor 41 in accordance with the fourth exemplary embodiment, the end surface 4t perpendicular to the axis 0 of the output shaft radial protrusion 4d may directly contact the front surface of the rotor 6. As such, the rotor 6 may be configured such that its position along the direction of the axis 0 may be changed without rattling. As such, the front surface of the rotor 6 may form a taper extending inward toward the radial protrusion 4d and downward toward the output shaft 4, as shown in FIG. 11. As such, front tapered surface of rotor 6 may be deformable in a manner similar to stoppers 13, 23, and 23 of the first, second, and third exemplary embodiments.

When an attraction force (i.e., an electromagnetic force) is greater than the value shown in FIG. 11, a magnitude of the electromagnetic force in the direction of the axis 0 may pull the rotor 6 toward protrusion 4d. In such a case, because the front surface of the rotor 6 may be deformed by the thrust, the taper may be decreased. Further, the radius of the contact area between radial protrusion 4d and the rotor 6 may also be increased.

As such, the radius of the contact surface of the output shaft 4 and the rotor 6 may be changed by the magnitude of the electromagnetic force in the direction of the axis 0. The characteristic resonant frequency where the rotor 6 is resonated by the surface vibration may be changed. As such, because it may be possible to prevent the resonance of the surface vibration of the rotor 6, quiet operation of the axial gap-type motor 41 becomes possible.

In the axial gap-type electrical motors 11, 21, 31 and 41 of the first to fourth exemplary embodiments as described above, the radius of the contact surface of the output shaft 4 and the rotor 6 may be changed by the magnitude of the electromagnetic (attraction) force in the direction of the axis 0. The electromagnetic force may be controlled based on a relationship between the alternating current and the attraction force shown in FIG. 12.

Figure 12:
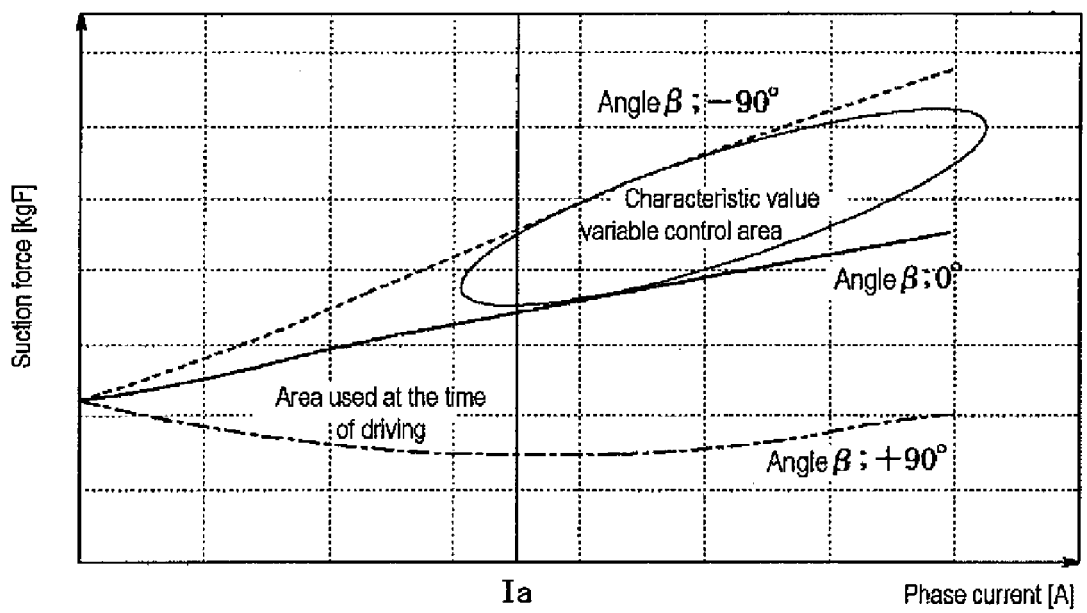
FIG. 12 is a graph showing a relationship between the phase current and the attraction force of the axial gap-type electrical motors in accordance with the first to fourth exemplary embodiments.

In FIG. 12, the horizontal axis is an effective value (or maximum value) of a phase current flowing through the armature winding, and the longitudinal axis is the attraction force, which becomes the magnitude of the electromagnetic force in the direction of the axis 0 generated between the stator 1 and the rotor 6. Further, in FIG. 12, a dash line indicates when a current phase angle β becomes −90 degrees (i.e., a strong field system). Also, a solid line indicates when the current phase angle β is 0 (zero) degrees and a chain line indicates when the current phase angle β is +90 degree (i.e., a weak field system).

Generally, the axial gap-type electrical motors 11, 21, 31 and 41 may be driven with the phase current equal to or less than Ia. Further, a weak field system control is performed wherein a polarity of the current phase angle β is on the positive side. As such, the attraction force is decreased. Thus, as shown in FIG. 12, an area used at the time of driving in the general operation may be indicated by being surrounded by a line when β is 0 (zero) degree, a line when the current phase angle β is +90 degree and a line when the phase current is Ia.

As for the area used at the time of driving in the general operation, when the characteristic frequency of the rotor 6 is changed as shown in FIGS. 4 and 8 to be deviated from the rotational speed of the rotor 6, the axial gap-type electrical motors 11, 21, 31 and 41 may be driven with the phase current equal to or more than Ia. Further, a strong field system control is performed wherein a polarity of the current phase angle β is on the negative side. As such, the attraction force is increased. As indicated by a solid line ellipse, FIG. 12 shows a characteristic value variable control area in the operation of spacing the characteristic frequency from the rotational speed.

Figure 13:
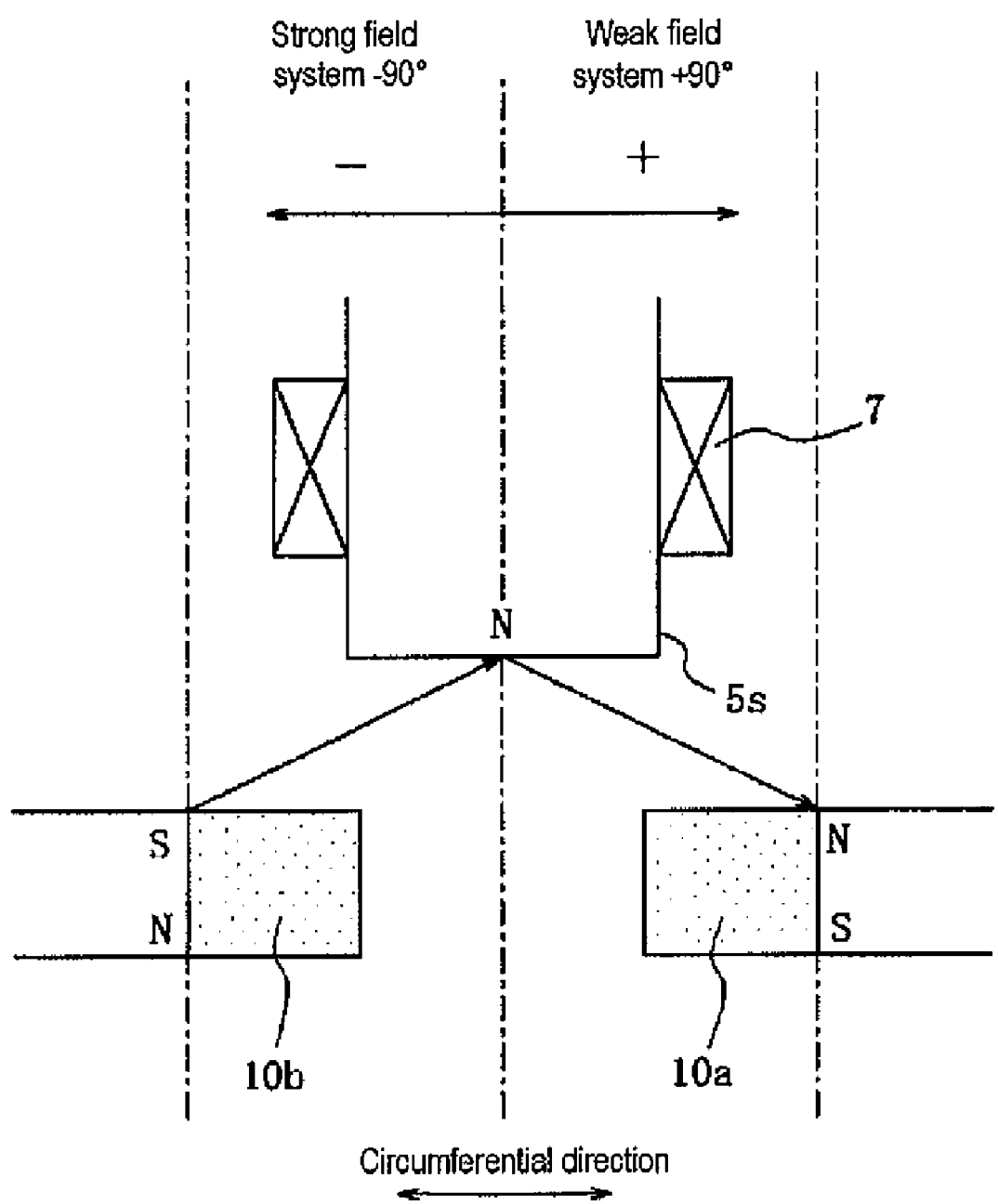
FIG. 13 is a schematic view of a relative position relationship in a circumferential direction of a stator iron core and a rotor permanent magnet.

The weak field system control and the strong field system control will be explained herein while referring to FIG. 13. FIG. 13 is a schematic view showing a relative position relationship in a circumferential direction of the stator iron core 5 and the magnet 10, illustrating when the current phase angle β is 0 (zero) degree. In FIG. 13, when a polarity of the current phase angle β is on the negative side, because a permanent magnet 10b having a south pole front surface becomes closer to the stator iron core 5 having the north pole leading end 5s, it can be understood that the attraction force is increased.

Fifth Exemplary Embodiment

Figure 14:
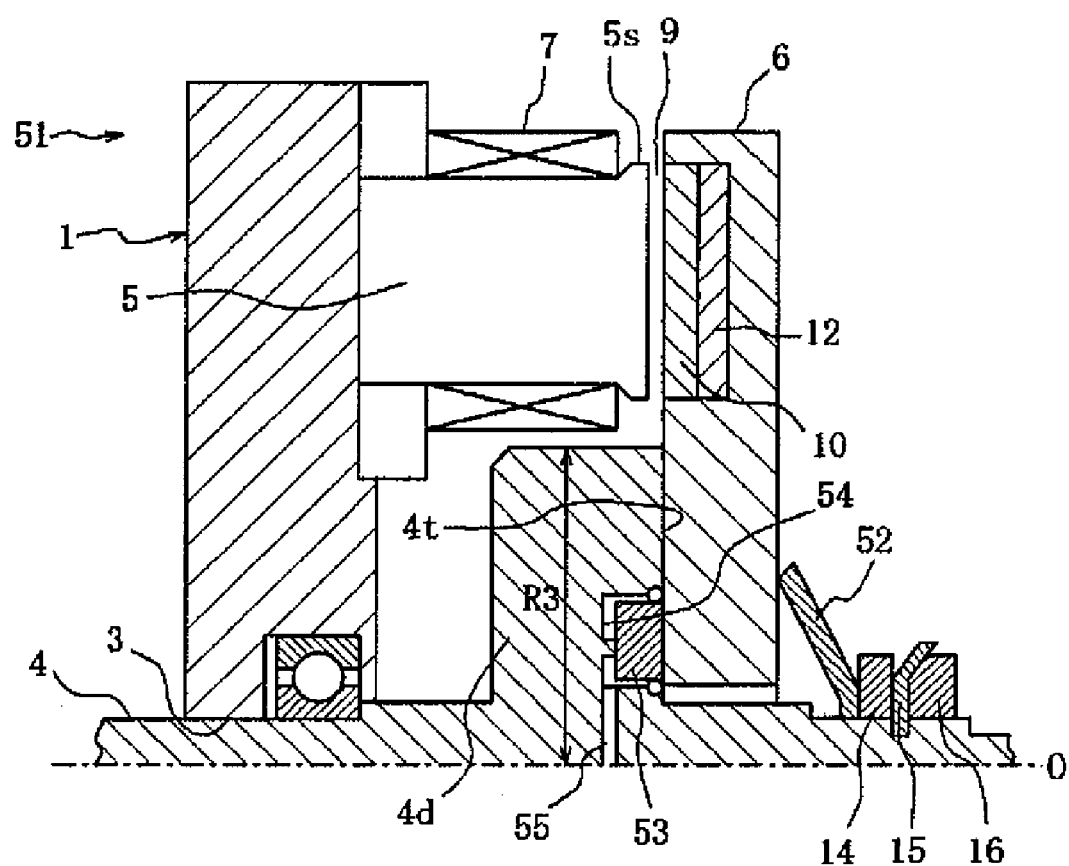
FIG. 14 is a cross-sectional view schematically showing a structure of an axial gap-type electrical motor operating in a second operational state in accordance with a fifth exemplary embodiment of the present disclosure.
Figure 15:
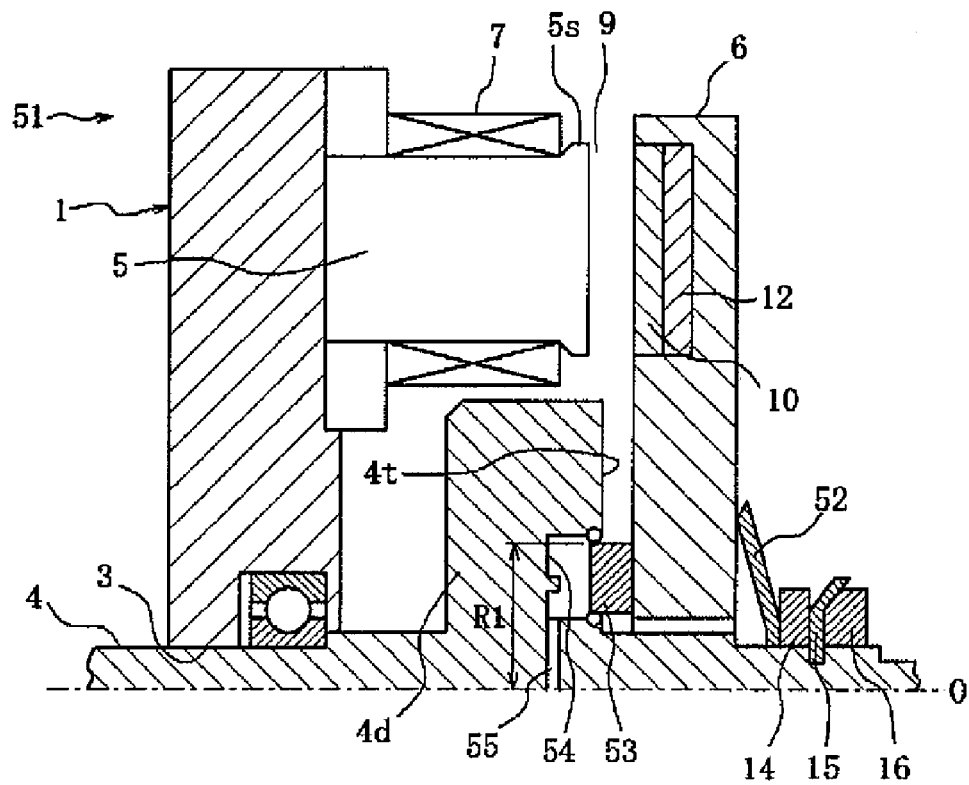
FIG. 15 is a cross-sectional view schematically showing a structure of an axial gap-type electrical motor operating in a first operational state in accordance with the fifth exemplary embodiment of the present disclosure.

FIGS. 14 and 15 are cross-sectional views schematically showing a structure of an axial gap-type electrical motor 51 in accordance with a fifth exemplary embodiment of the present disclosure. FIG. 14 shows a state when the radius of the contact surface is large (R3). FIG. 15 shows a state when the radius of the contact surface is smaller than the value shown in FIG. 14 (R1). Because the basic constitution of the fifth exemplary embodiment is similar to that of the first exemplary embodiment, similar elements are denoted by the same reference numerals and explanations thereof are omitted herein.

An axial gap-type electrical motor 51 in accordance with the fifth exemplary embodiment may comprise an actuator to change a contact area of the rotor 6 and the output shaft 4. Such an actuator may be a piston mechanism for displacing the rotor 6 in the direction of axis 0.

A ring-shaped disc spring 52 through which the output shaft 4 passes may be arranged adjacent to the rear surface of the rotor 6. A collar 14 may prevents the disc spring 52 from moving away from the rotor 6 in the direction of the axis 0. As shown, the disc spring 52 presses the rotor 6 toward the stator 2 in the direction of the axis 0 and pushes the rotor 6 into contact with the radial protrusion 4d of the output shaft 4d as shown in FIG. 14.

As shown, the radial protrusion 4d may contain a piston 53 which is configured to be slidably moveable along the direction of the axis 0 and a cylinder 54 for housing the piston 53. The cylinder 54 may be in communication with hydraulic lines 55 installed in an inner portion of the output shaft 4. While the rotor 6 is in contact with the radial protrusion 4d and the contact area has a large radius (R3), the piston 53 is completely housed within the cylinder 54, as shown in FIG. 14.

If a hydraulic pressure is supplied from the through hydraulic line 55 to the cylinder 54, piston 53 may be forced to protrude from the end surface 4t of the radial protrusion 4d and may displace the rotor 6 towards the disc spring 52. As such, the radius of the contact surface between the rotor 6 and the output shaft radial protrusion 4d may be reduced to R1 as shown in FIG. 15.

Further, if the hydraulic pressure of the cylinder 54 is reduced, then the piston 53 may retract into end surface 4t by a biasing force of the disc spring 52 pushing the rotor 6 in a direction toward the radial protrusion 4d. As such, the radius of the contact surface may be optionally changed to either R1 or R3 by activating or deactivating piston 53 in cylinder 54 by changing the pressure within hydraulic line 55.

In the fifth exemplary embodiment, the output shaft 4, the collar 14, a washer 15, the disc spring 52, a lock nut 16, and the piston 53 may be interactively operated to constitute a device for changing the contact area between rotor 6 and protrusion 4*d*.

Figure 16:
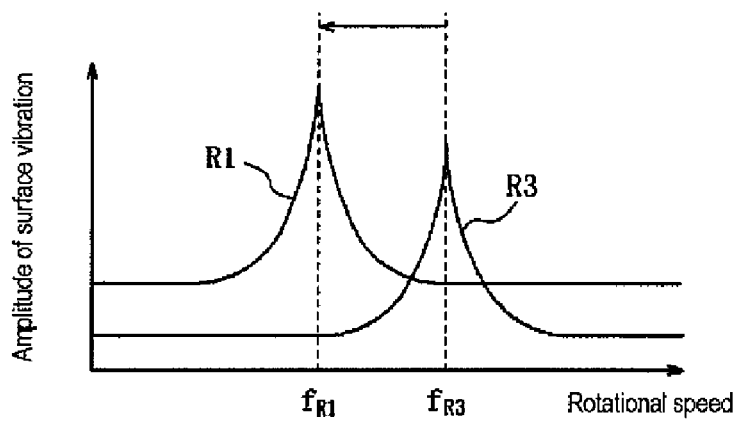
FIG. 16 is a graph showing a relationship between amplitude of a surface vibration of a rotor and a rotational speed of a rotor in accordance with the fifth exemplary embodiment of the present disclosure.

As mentioned above, when the radius of the contact surface is R3, the characteristic frequency resonated by the surface vibration (rotational speed) is fR3, as shown in FIG. 16. When the radius of the contact surface is R1, the characteristic frequency resonated by the surface vibration (rotational speed) is fR1. If the contact surface of the rotor 6 and the output shaft 4 has a large radius (R3), because the rigidity of the support of the rotor 6 is high, the characteristic frequency fR3 becomes greater than the characteristic frequency fR1, as shown in FIG. 16. To make the characteristic frequency small as indicated by the arrow in FIG. 16, the radius of the contact surface may be decreased from R3 to R1 by supplying the hydraulic pressure to the cylinder 54.

Further, because the rotor 6 may be displaced along the direction of the axis 0 by using the piston mechanism in the axial gap-type electrical motor 51 in accordance with the fifth exemplary embodiment, an amount of displacement of the rotor 6 along the direction of the axis 0 may be increased more than would be possible using the axial gap-type electrical motors 11, 21, 31, and 41 in accordance with the first to fourth exemplary embodiments. As a result, air gap 9 may be increased. Thus, when the rotational speed of the rotor exceeds a predetermined value, an induced voltage disadvantageous for a high speed rotation as a motor may be reduced by increasing the air gap 9.

As described above, the axial gap-type electrical motors 11, 21, 31, 41 and 51 in accordance with the first to fifth exemplary embodiments are depicted having only one rotor. However, it should be understood that with axial gap-type electrical motors having two (or more) rotors 6 and one (or more) stator 2 explained below in reference to FIGS. 17 and 18, it may still be possible to modify the characteristic resonant frequency of the motor by changing the contact area between rotors 6 and the output shafts 4.

Sixth Exemplary Embodiment

Figure 17:
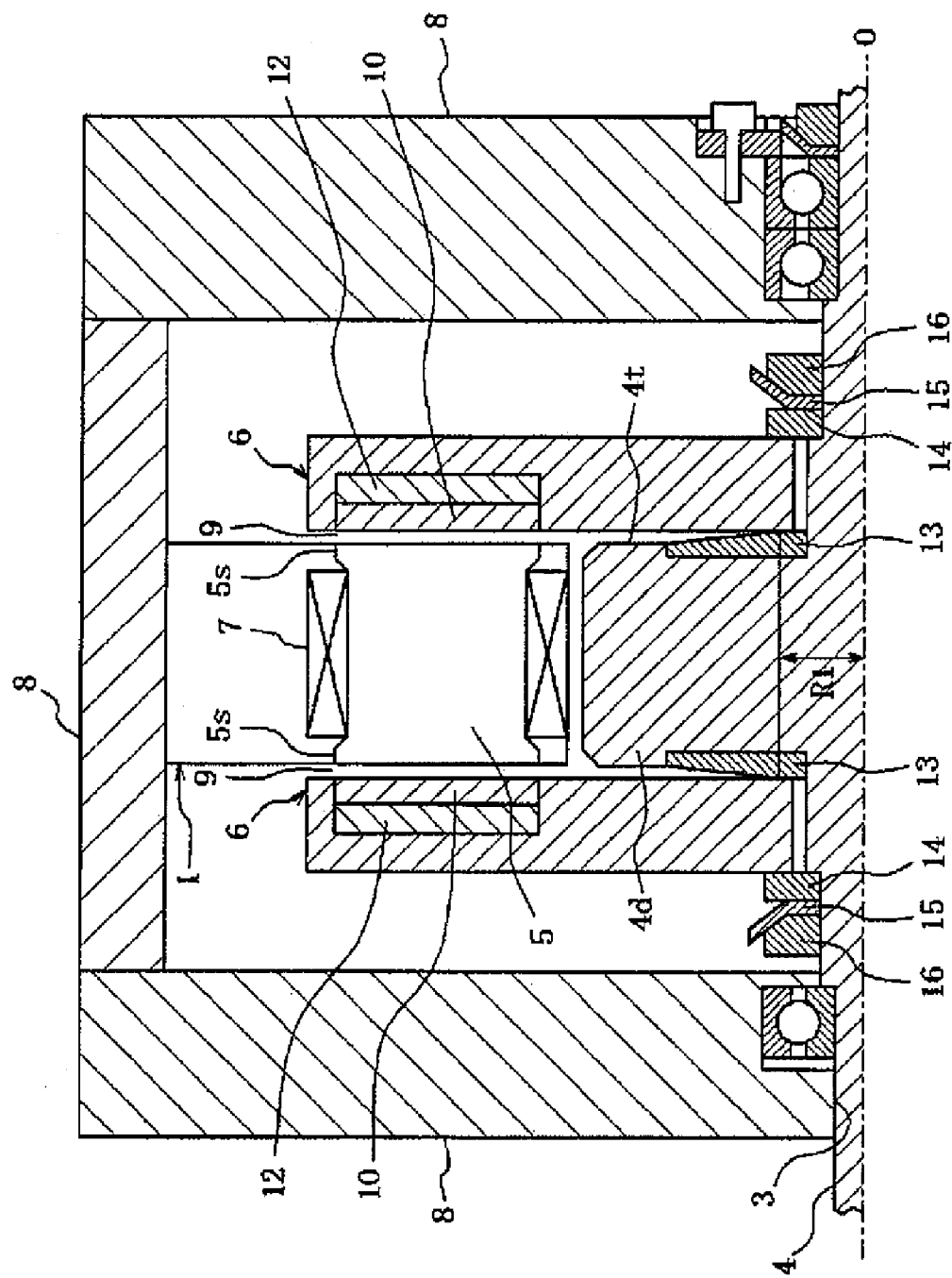
FIG. 17 is a cross-sectional view schematically showing a structure of an axial gap-type electrical motor in accordance with a sixth exemplary embodiment of the present disclosure.

FIG. 17 is a cross-sectional view schematically showing a structure of an axial gap-type electrical motor 61 in accordance with a sixth exemplary embodiment of the present disclosure, showing when the radius of the contact surface is small (R1). The basic constitution of the sixth exemplary embodiment is substantially similar to that of the first exemplary embodiment with the exception that two rotors 6 are symmetrically arranged about a single stator 1.

Seventh Exemplary Embodiment

Figure 18:
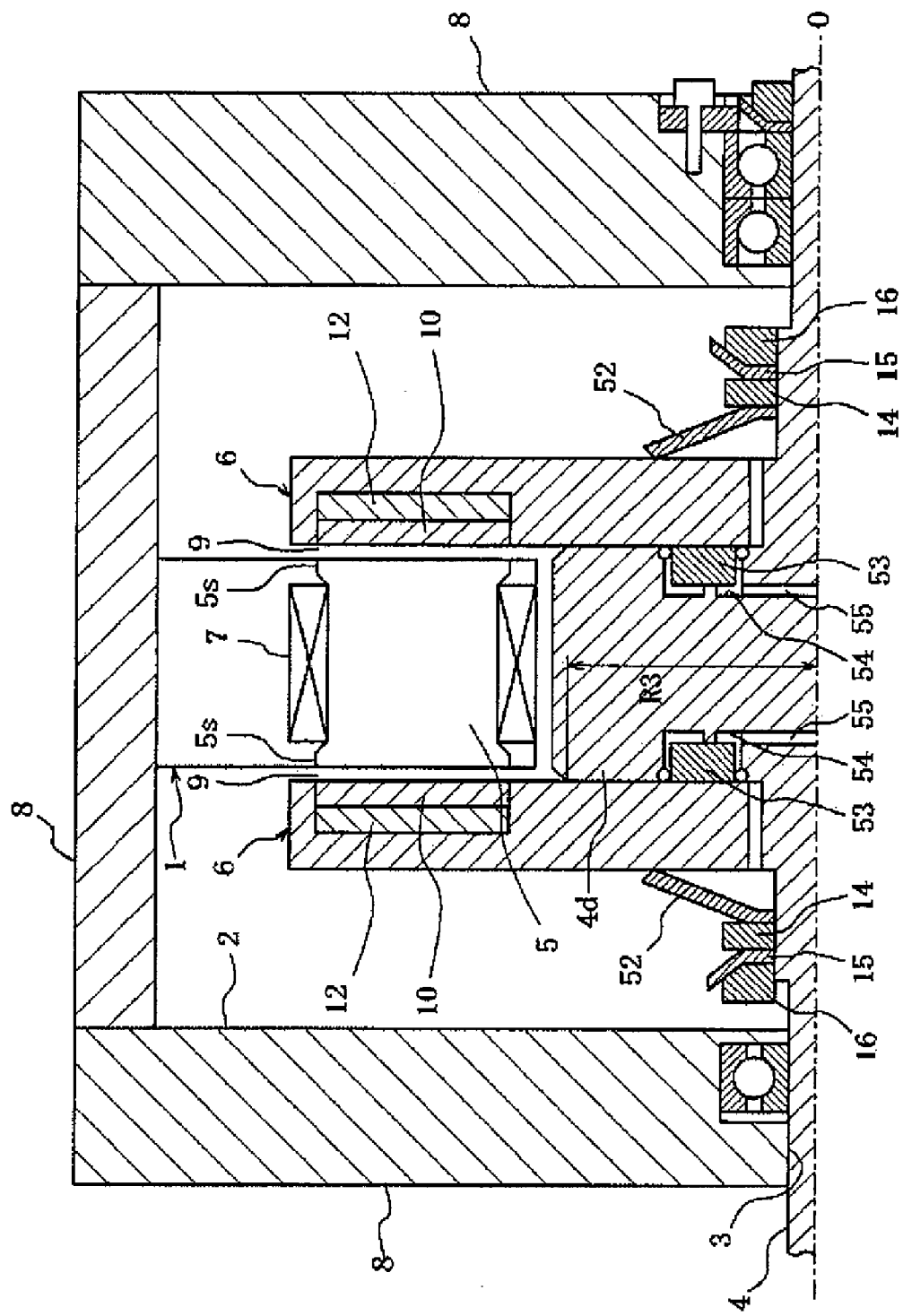
FIG. 18 is a cross-sectional view schematically showing a structure of an axial gap-type electrical motor in accordance with a seventh exemplary embodiment of the present disclosure.

FIG. 18 is a cross-sectional view schematically showing a structure of an axial gap-type electrical motor 71 in accordance with a seventh exemplary embodiment of the present disclosure, showing when the radius of the contact surface is large (R3). The basic constitution of the seventh exemplary embodiment is substantially similar to that of the fifth exemplary embodiment of FIG. 13 with the exception that two rotors 6 are symmetrically arranged about a single stator 1.

Advantageously, the present disclosure provides a technique for effectively preventing the resonance of the rotor without installing a separate reinforcing member in the rotor. In order to achieve such an advantage, an axial gap-type electrical motor of the present disclosure may comprise a disk-shaped rotor arranged opposite a stator, wherein the rotor and the stator are spaced apart axially along an output shaft which engages to the rotor, and a device for changing a contacting area between the rotor and the output shaft depending on a rotational speed of the rotor.

As such, it may be possible to deviate a characteristic resonant frequency at a particular rotational speed by modifying the joining state between the rotor and the output shaft engaged to the rotor. As such, it may be possible to conduct a quiet operation by preventing the resonance of the rotor itself during an operation of the electrical motor.

While the disclosure has been presented with respect to a limited number of embodiments, those skilled in the art, having benefit of this disclosure, will appreciate that other embodiments may be devised which do not depart from the scope of the present disclosure. Accordingly, the scope of the disclosure should be limited only by the attached claims.

What is claimed is:

1. An electric motor, comprising:
    a stator;
    at least one rotor, the at least one rotor rotating in accordance with an electromagnetic force that is caused between the stator and the rotor;
    an output shaft engaged with the at least one rotor; and
    a contact area changing device configured to increase an area of contact between the at least one rotor and the output shaft as the electromagnetic force increases; and
    wherein the area of contact between the at least one rotor and the output shaft affects a characteristic resonant frequency of the at least one rotor.

2. The electric motor of claim 1, wherein the contact area changing device changes the area of contact between the at least one rotor and the stator as a function of a rotational speed of the at least one rotor.

3. The electric motor of claim 2, wherein the area of contact decreases as the rotational speed of the at least one rotor increases.

4. The electric motor of claim 1, wherein:
    the output shaft comprises a radial protrusion; and
    the contact area changing device is configured to affect contact between the at least one rotor and the radial protrusion.

5. The electric motor of claim 4, wherein the radial protrusion comprises:
    an end surface facing the at least one rotor;
    a recess configured to retain a stopper between the at least one rotor and the radial protrusion;
    the stopper being formed of a material less rigid than the recess of the radial protrusion; and
    the radial protrusion contacts the rotor upon deformation of the stopper.

6. The electric motor of claim 1, wherein the contact area changing device comprises a stopper comprising a deformable contact surface.

7. The electric motor of claim 6, wherein the deformable contact surface comprises at least one of a linear taper surface, a straight surface, and an arcuate surface.

8. The electric motor of claim 1, wherein the contact area changing device comprises a deformable contact surface of the at least one rotor.

9. The electric motor of claim 1, wherein:
    the output shaft includes a radial protrusion;
    the at least one rotor is biased toward the radial protrusion;
    the contact area changing device comprises an actuator configured to exhibit a pressing force between the at least one rotor and the radial protrusion; and
    the actuator is configured to change a radius of contact between the at least one rotor and the radial protrusion as it presses between the at least one rotor and the radial protrusion to thereby change the area of contact.

10. The electric motor of claim 9, wherein the actuator comprises a piston mechanism.

11. The electric motor of claim 9, wherein the piston mechanism is configured to increase an air gap between the at least one rotor and the stator.

12. The electric motor of claim 11, wherein:
the magnitude of the electromagnetic force produces an attraction force between the stator and the at least one rotor; and
the electromagnetic field controller is configured to allow a polarity of the current phase angle to achieve a target output torque of the output shaft to reinforce the attraction force.

13. The electric motor of claim 1, further comprising:
an armature winding installed in the stator; and
a permanent magnet installed in the at least one rotor; and
an electromagnetic field controller;
wherein the at least one rotor is driven at a synchronous speed corresponding to an electromagnetic field system through the armature winding;
wherein the electromagnetic field controller is configured to control a magnitude of an electromagnetic force in response to a current value and a current phase angle of the armature winding.

14. A method to reduce vibrations in an electric motor, the method comprising:
engaging an output shaft into at least one rotor;
rotating the output shaft and the at least one rotor with respect to a stator, the at least one rotor rotating in accordance with an electromagnetic force that is caused between the stator and the rotor;
increasing an area of contact between the at least one rotor and a radial protrusion of the output shaft as the electromagnetic force becomes stronger; and
shifting the resonant frequency of the at least one rotor with the changed area of contact.

15. The method of claim 14, further comprising deforming a contact surface of at least one of the at least one rotor and the radial protrusion to change the area of contact.

16. The method of claim 14, further comprising actuating the at least one rotor away from the radial protrusion to change the area of contact.

17. The method of claim 14, further comprising shifting the resonant frequency off the at least one rotor as a function of rotor speed.

18. The method of claim 14, further comprising shifting the resonant frequency off the at least one rotor as a function of electromagnetic force between the at least one rotor and the stator.

19. An electric motor, comprising:
a stator;
at least one rotor means;
an output shaft means engaged with the at least one rotor means, the at least one rotor means rotating in accordance with an electromagnetic force that is caused between the stator and the rotor; and
a contact area changing means for increasing an area of contact between the at least one rotor and the output shaft as the electromagnetic force increases; and
wherein the area of contact between the at least one rotor and the output shaft affects a characteristic resonant frequency of the at least one rotor means.

* * * * *